United States Patent
Zhu

(10) Patent No.: US 12,467,562 B2
(45) Date of Patent: Nov. 11, 2025

(54) CONNECTING PIPE ASSEMBLY AND CONTROL VALVE ASSEMBLY WITH CONNECTING PIPE ASSEMBLY

(71) Applicant: ZHEJIANG DUNAN ARTIFICIAL ENVIRONMENT CO., LTD., Zhejiang (CN)

(72) Inventor: Jiafeng Zhu, Zhejiang (CN)

(73) Assignee: ZHEJIANG DUNAN ARTIFICIAL ENVIRONMENT CO., LTD., Zhejiang (CN)

( * ) Notice: Subject to any disclaimer, the term of this patent is extended or adjusted under 35 U.S.C. 154(b) by 0 days.

(21) Appl. No.: 18/694,842

(22) PCT Filed: Sep. 21, 2022

(86) PCT No.: PCT/CN2022/120311
§ 371 (c)(1),
(2) Date: Mar. 22, 2024

(87) PCT Pub. No.: WO2023/045984
PCT Pub. Date: Mar. 30, 2023

(65) Prior Publication Data
US 2024/0392909 A1    Nov. 28, 2024

(30) Foreign Application Priority Data

Sep. 22, 2021   (CN) .......................... 202122297347.5

(51) Int. Cl.
*F16L 13/02*   (2006.01)
(52) U.S. Cl.
CPC ................. *F16L 13/0209* (2013.01)

(58) Field of Classification Search
CPC ... F16L 13/02; F16L 13/0209; F16L 13/0236; F16L 13/08
See application file for complete search history.

(56) References Cited

U.S. PATENT DOCUMENTS

| | | | |
|---|---|---|---|
| 2005/0151369 A1* | 7/2005 | Baruh | ................ F16L 21/002 |
| 2021/0285579 A1 | 9/2021 | French et al. | |
| 2022/0154856 A1* | 5/2022 | Hamadate | ........... F16L 13/0209 |

FOREIGN PATENT DOCUMENTS

| | | |
|---|---|---|
| CN | 205781507 U | 12/2016 |
| CN | 109519389 A | 3/2019 |

(Continued)

OTHER PUBLICATIONS

Machine Translation of CN113236879A.*

(Continued)

*Primary Examiner* — Zachary T Dragicevich
(74) *Attorney, Agent, or Firm* — The Sun IP Law

(57) ABSTRACT

Provided is a connecting pipe assembly and a control valve assembly. The connecting pipe assembly includes a first connecting pipe, a connecting sleeve and a second connecting pipe; a first end of the first connecting pipe is disposed in the connecting sleeve, the connecting sleeve is provided with a first end and a second end opposite to each other, the first end of the connecting sleeve is connected with an outer side wall of the first connecting pipe, the inner wall of the middle part of the connecting sleeve and the outer wall of the first end of the first connecting pipe have a gap in between, the gap forms an accommodating cavity; and one end of the second connecting pipe is connected with the second end of the connecting sleeve, and an end of the second connecting pipe is disposed in the connecting sleeve.

10 Claims, 5 Drawing Sheets

(56) References Cited

FOREIGN PATENT DOCUMENTS

| | | | |
|---|---|---|---|
| CN | 110366655 A | 10/2019 |
| CN | 111594669 A | 8/2020 |
| CN | 113236879 A | 8/2021 |
| CN | 216158525 A | 4/2022 |
| DE | 69510429 T2 | 12/1999 |
| DE | 102007000644 A1 | 5/2008 |
| DE | 102014114088 B4 | 4/2015 |
| EP | 3683484 A | 7/2020 |
| GB | 391966 A | 5/1933 |
| JP | S52118615 A | 10/1977 |
| JP | H05133489 A | 5/1993 |
| JP | 2005121131 A | 5/2005 |
| JP | 2007046880 A | 2/2007 |
| JP | 2008513687 A | 5/2008 |
| JP | 2021036188 A | 3/2021 |
| JP | 2021085507 A | 6/2021 |

OTHER PUBLICATIONS

The first office action of counterpart DE application No. 112022004496.9 issued on Sep. 24, 2024.
Office action of counterpart JP application No. 2024-516754 issued on Jul. 25, 2025.

* cited by examiner

CONNECTING PIPE ASSEMBLY AND CONTROL VALVE ASSEMBLY WITH CONNECTING PIPE ASSEMBLY

CROSS-REFERENCE TO RELATED APPLICATION

The present disclosure is a national stage application of International Patent Application No. PCT/CN2022/120311, which is filed on Sep. 21, 2022, and claims priority to Chinese Patent Application No. 202122297347.5, filed on Sep. 22, 2021 and entitled "Connecting Pipe Assembly and Control Valve Assembly with Connecting Pipe Assembly", the contents of which are hereby incorporated by reference in its entirety.

TECHNICAL FIELD

The disclosure relates to a technical field of control valves, and in particular relates to a connecting pipe assembly and a control valve assembly with the connecting pipe assembly.

BACKGROUND

At present, an existing control valve includes a valve body and a connecting pipe, the valve body is provided with a valve pipe, and the connecting pipe is connected with the valve body via the valve pipe, In the prior art, the valve pipe is fixed to the connecting pipe by welding. During a welding process, excessive addition of solder or multiple times of plug and pull welding can form weld beading and welding slag in the welding area, which can easily fall into the valve body from the valve pipe, causing blockages in the valve body and affecting normal use of the control valve.

SUMMARY

Some embodiments of the present disclosure provide a connecting pipe assembly and a control valve assembly, and aim to solve the problem that normal use of a control valve is affected due to poor welding of a connecting pipe assembly in the prior art.

Some embodiments of the present disclosure provide a connecting pipe assembly, and the connecting pipe assembly includes a first connecting pipe, a connecting sleeve and a second connecting pipe, where the first connecting pipe includes a first end and a second end opposite to each other; where the first end of the first connecting pipe is disposed in the connecting sleeve, the connecting sleeve includes a first end and a second end opposite to each other, the first end of the connecting sleeve is connected with an outer side wall of the first connecting pipe, there is a gap between an inner wall of a middle part of the connecting sleeve and the outer side wall of the first end of the first connecting pipe, and the gap forms an accommodating cavity; and one end of the second connecting pipe is connected with the second end of the connecting sleeve, and the one end of the second connecting pipe is disposed in the connecting sleeve.

By arrangement of the above structure, the first end of the first connecting pipe is disposed in the connecting sleeve, and there is a gap between the inner wall of the middle part of the connecting sleeve and the outer wall of the first end of the first connecting pipe, and the gap forms an accommodating cavity. The accommodating cavity can accommodate the resulting weld beading, welding slag or excess solder when the connecting sleeve is welded with the second connecting pipe, thereby preventing the weld beading, welding slag or excess solder from flowing out of the weld joint, and ensuring normal use of the control valve.

In some embodiments, a wall thickness of the second connecting pipe is T, and a maximum dimension of the gap in radial direction of the first connecting pipe is t, $0<t<T$. By setting the wall thickness of the second connecting pipe to be T, and the maximum dimension of the gap in radial direction to be t, $0<t<T$, the welding effect is improved while further ensuring normal use of the control valve.

In some embodiments, the one end of the second connecting pipe disposed in the connecting sleeve is abutted against the first end of the first connecting pipe, and the one end of the second connecting pipe disposed in the connecting sleeve, the outer wall of the first end of the first connecting pipe and the inner wall of the middle part of the connecting sleeve work together to seal the accommodating cavity. By such arrangement, the first connecting pipe, the connecting sleeve and the second connecting pipe are connected with each other to seal the accommodating cavity, so that the weld beading, welding slag or excess solder after welding are prevented from overflowing out of the accommodating cavity and flowing into the control valve, thereby ensuring the stability of the control valve during operation.

In some embodiments, the connecting sleeve includes a first section, a second section and a third section which are connected with each other. The first section of the connecting sleeve is connected with the first connecting pipe, the third section of the connecting sleeve is connected with the second connecting pipe, and the accommodating cavity is formed between an inner wall of the second section and the outer wall of the first end of the first connecting pipe. An inner diameter of the second section gradually increases along a direction from the first section to the third section. By the above arrangement, the connecting sleeve with a variable diameter structure can ensure connection between the connecting sleeve and the first connecting pipe and second connecting pipe, improving the stability during welding, and also facilitating formation of the accommodating cavity to accommodate the weld beading, welding slag or excess solder after welding.

In some embodiments, an inner diameter of the third section is D, and a diameter of the outer wall of the first end of the first connecting pipe is d, $t=(D-d)*0.5$. By such arrangement, the structure is simple and convenient for machining of the accommodating cavity.

In some embodiments, a length of the first section is L1, a distance between an end face of the first end of the connecting sleeve and an end face of the first end of the first connecting pipe is L2, and the maximum axial length of the accommodating cavity is L, $L=L2-L1$, and $L>0$. The above arrangement can ensure the capacity of the accommodating cavity. Also, the maximum axial length L of the accommodating cavity, which is set to $L=L2-L1$ and $L>0$, is conducive to positioning of the connecting sleeve and the first connecting pipe, thereby facilitating welding of components after connection.

In some embodiments, a limiting structure is disposed on an inner wall of the connecting sleeve, the limiting structure is axially spaced apart from the first end of the first connecting pipe, and the limiting structure is used for limiting an axial position of the second connecting pipe in the connecting sleeve. By the limiting structure, the end face of the second connecting pipe and the end face of the first connecting pipe have a certain distance in between, so that the accommodating area of the accommodating cavity is further increased and the accommodating cavity can accommodate more weld beading, welding slag or excess solder, further improving the welding effect.

In some embodiments, a plurality of protrusions are disposed on an inner wall of the connecting sleeve, the plurality of protrusions form the limiting structure, and the plurality of protrusions are spaced in circles on the inner wall of the connecting sleeve. By the above arrangement, the axial position of the second connecting pipe in the connecting sleeve can be further limited, thereby ensuring the connection stability between the second connecting pipe and the connecting sleeve.

In some embodiments, the limiting structure includes a protrusion, and the protrusion is disposed in circles on the inner wall of the connecting sleeve. By such arrangement, the contact area between the protrusion and the second connecting pipe can be increased, and the axial position of the second connecting pipe in the connecting sleeve can be limited, thereby facilitating welding of the second connecting pipe with the connecting sleeve, and further ensuring the connection stability between the second connecting pipe and the connecting sleeve.

Some embodiments of the present disclosure provide a control valve assembly, and the control valve assembly includes the aforementioned connecting pipe assembly.

BRIEF DESCRIPTION OF THE DRAWINGS

The accompanying drawings of the description, which constitute a part of the present disclosure, are used for facilitating further understanding of the present disclosure. The illustrative embodiments of the present disclosure and explanations thereof are used for explaining the present disclosure and do not constitute an improper limitation to the present disclosure. In the accompanying drawings.

The above figures include the following numerals:
10. First connecting pipe;
20. Connecting sleeve; 21. First section; 22. Second section; 23. Third section; 24. Limiting structure; 241, Protrusion;
30. Accommodating cavity; and
40. Second connecting pipe.

DETAILED DESCRIPTION OF THE EMBODIMENTS

The following will provide a clear and complete description of the technical solution in the embodiments of the present disclosure, in conjunction with the accompanying drawings in the embodiments of the present disclosure. It is obvious that the described embodiments are only a part, but not all, of the embodiments of the present disclosure. The following description of at least one exemplary embodiment is merely illustrative in nature and is in no way intended to limit the present disclosure, and application or use thereof. Based on the embodiments of the present application, all other embodiments obtained by those of ordinary skill in the art without creative efforts shall fall within the protection scope of the present disclosure.

Figure 1:
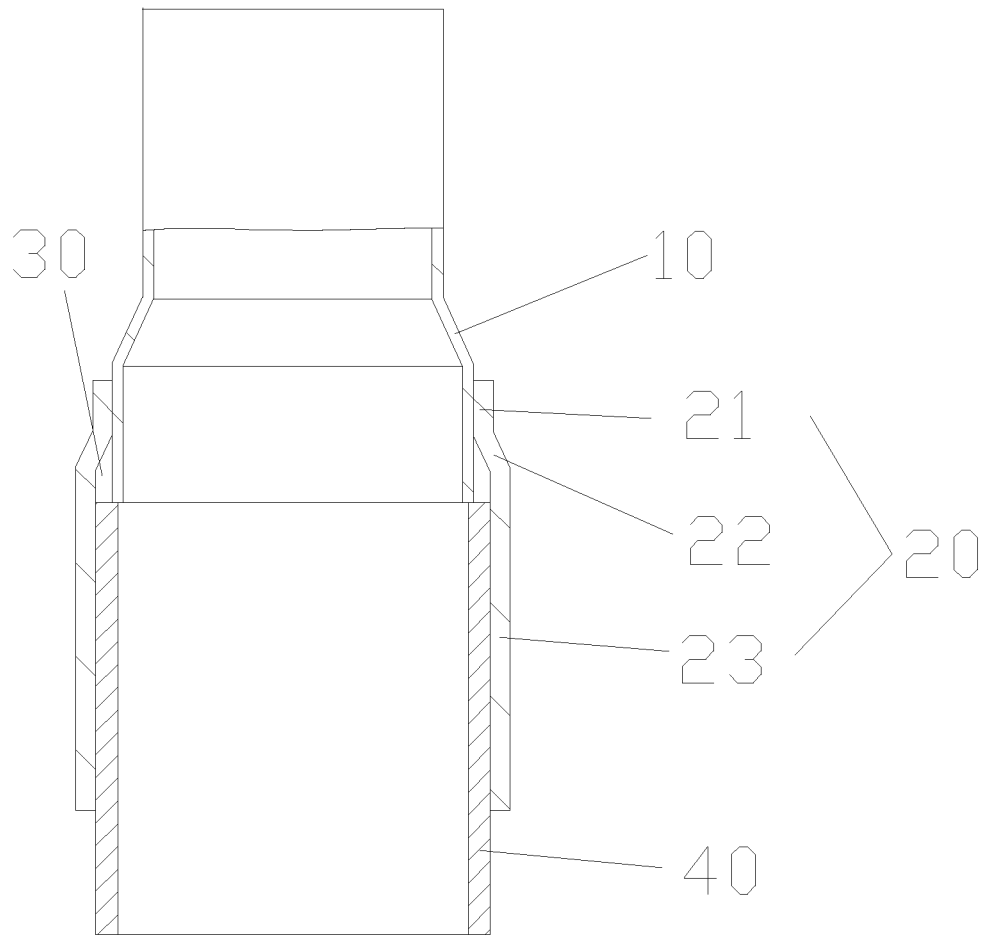
FIG. 1 illustrates a cross-sectional view of the connecting pipe assembly provided by the present disclosure.
Figure 2:
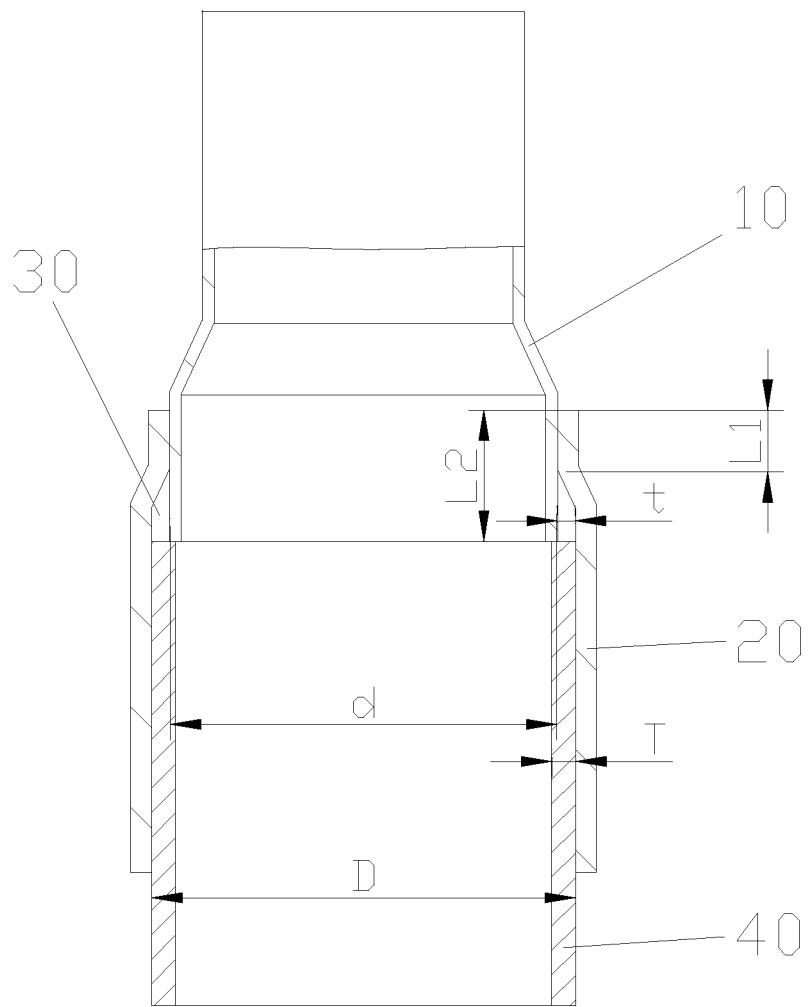
FIG. 2 illustrates a dimensional schematic diagram of the connecting pipe assembly provided by the present disclosure.
Figure 3:
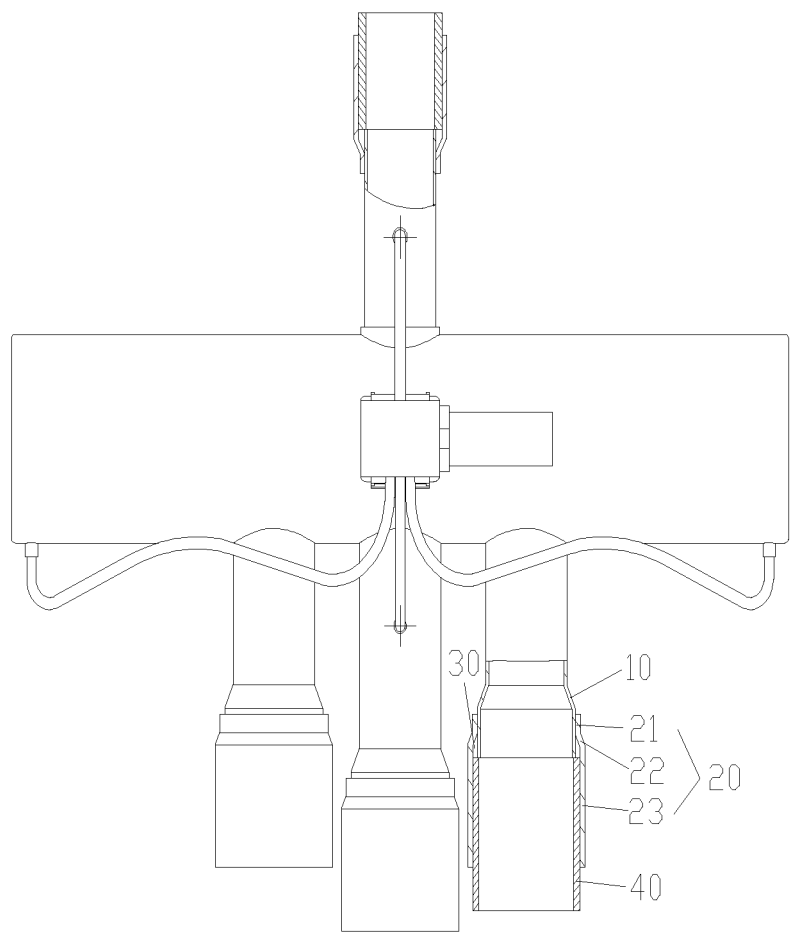
FIG. 3 illustrates a cross-sectional view of a first embodiment of a control valve assembly provided by the present disclosure.

As shown in FIG. 1 to FIG. 3, Embodiment 1 of the present disclosure provides a connecting pipe assembly, and the connecting pipe assembly includes a first connecting pipe 10, a connecting sleeve 20 and a second connecting pipe 40. The first connecting pipe 10 includes a first end and a second end opposite to each other. The first end of the first connecting pipe 10 is disposed in the connecting sleeve 20, the connecting sleeve 20 includes a first end and a second end opposite to each other, the first end of the connecting sleeve 20 is connected with an outer side wall of the first connecting pipe 10, there is a gap between an inner wall of a middle part of the connecting sleeve 20 and the outer side wall of the first end of the first connecting pipe 10, and the gap forms an accommodating cavity 30. One end of the second connecting pipe 40 is connected with the second end of the connecting sleeve 20, and the one end of the second connecting pipe 40 is disposed in the connecting sleeve 20. In the present embodiment, the first connecting pipe is connected with a valve port, and the second connecting pipe is connected with other external device.

By arrangement of the above structure, the first end of the first connecting pipe 10 is disposed in the connecting sleeve 20, and there is a gap between the inner wall of the middle part of the connecting sleeve 20 and the outer wall of the first end of the first connecting pipe 10, and the gap forms an accommodating cavity 30. The accommodating cavity 30 can accommodate the resulting weld beading, welding slag or excess solder when the connecting sleeve 20 is welded with the second connecting pipe 40, thereby preventing the weld beading, welding slag or excess solder from flowing out of the weld joint, and ensuring normal use of the control valve.

In some embodiments, a wall thickness of the second connecting pipe 40 is T, and a maximum dimension of the gap in radial direction of the first connecting pipe 10 is t, 0<t<T.

By setting the wall thickness of the second connecting pipe to be T, and the maximum dimension of the gap in radial direction to be t, 0<t<T, the welding effect is improved while further ensuring normal use of the control valve.

When t>T, the end of the second connecting pipe 40 is likely to extend into the gap between the inner wall of the middle part of the connecting sleeve 20 and the outer wall of the first end of the first connecting pipe 10 during installation. As a result, the accommodating cavity 30 cannot be formed between the first connecting pipe 10 and the connecting sleeve 20, and thus the weld beading, welding slag or excess solder cannot be accommodated. Therefore, in the present disclosure, the accommodating cavity 30 can be formed between the first connecting pipe 10 and the connecting sleeve 20 when t is set to 0–T. During welding, the solder can flow along the gap between the second connecting pipe 40 and the connecting sleeve 20, and the resulting weld beading, welding slag or excess solder can be accommodated in the accommodating cavity 30, thereby ensuring the welding effect of the connecting pipe assembly. Specifically, t can be set to 0.3 T, or 0.5 T or 0.8 T.

The one end of the second connecting pipe 40 disposed in the connecting sleeve 20 is abutted against the first end of the first connecting pipe 10, and the one end of the second connecting pipe 40 disposed in the connecting sleeve 20, the outer wall of the first end of the first connecting pipe 10 and the inner wall of the middle part of the connecting sleeve 20 work together to seal the accommodating cavity 30. By such arrangement, the first connecting pipe 10, the connecting sleeve 20 and the second connecting pipe 40 are connected with each other to seal the accommodating cavity 30, so that the weld beading, welding slag or excess solder after welding are prevented from overflowing from the accommodating cavity 30 and flowing into the control valve, thereby ensuring the stability of the control valve during operation.

In some embodiments, the connecting sleeve 20 includes a first section 21, a second section 22 and a third section 23 which are connected with each other. The first section 21 of the connecting sleeve 20 is connected with the first connecting pipe 10, the third section 23 of the connecting sleeve 20 is connected with the second connecting pipe 40, and the accommodating cavity 30 is formed between an inner wall of the second section 22 and the outer wall of the first end of the first connecting pipe 10. An inner diameter of the second section 22 gradually increases along a direction from the first section 21 to the third section 23. By the above arrangement, the connecting sleeve 20 with a variable diameter structure can ensure connection between the connecting sleeve 20 and the first connecting pipe 10 and second connecting pipe 40, improving the stability during welding, and also facilitating formation of the accommodating cavity 30 to accommodate the weld beading, welding slag or excess solder after welding.

As shown in FIG. 2, an inner diameter of the third section 23 is D, and a diameter of the outer wall of the first end of the first connecting pipe 10 is d, $t=(D-d)*0.5$. By such arrangement, the structure is simple and convenient for machining of the accommodating cavity 30.

In some embodiments, a length of the third section 23 is greater than a length of the first section 21. By such arrangement, the connection area between the third section 23 and the second connecting pipe 40 can be increased, thereby facilitating welding of the connecting sleeve 20 with the second connecting pipe 40, and improving the structural strength thereof after welding.

In some embodiments, the length of the first section 21 is L1, a distance between an end face of the first end of the connecting sleeve 20 and an end face of the first end of the first connecting pipe 10 is L2, and the maximum axial length of the accommodating cavity 30 is L, $L=L2-L1$, and $L>0$. The above arrangement can ensure the capacity of the accommodating cavity 30. Also, the maximum axial length L of the accommodating cavity 30, which is set to $L=L2-L1$ and $L>0$, is conducive to positioning of the connecting sleeve 20 and the first connecting pipe 10, thereby facilitating welding of components after connection.

Figure 4:
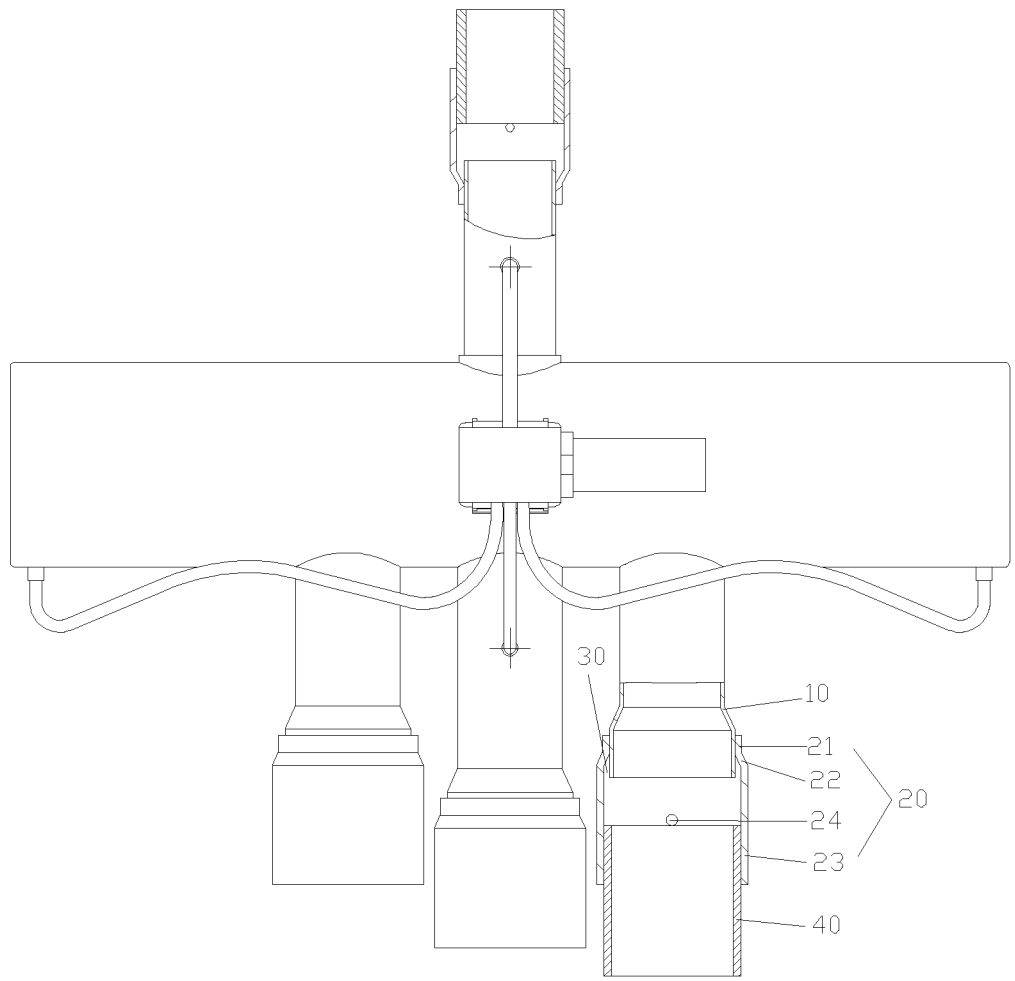
FIG. 4 illustrates a cross-sectional view of a second embodiment of the control valve assembly provided by the present disclosure.
Figure 5:
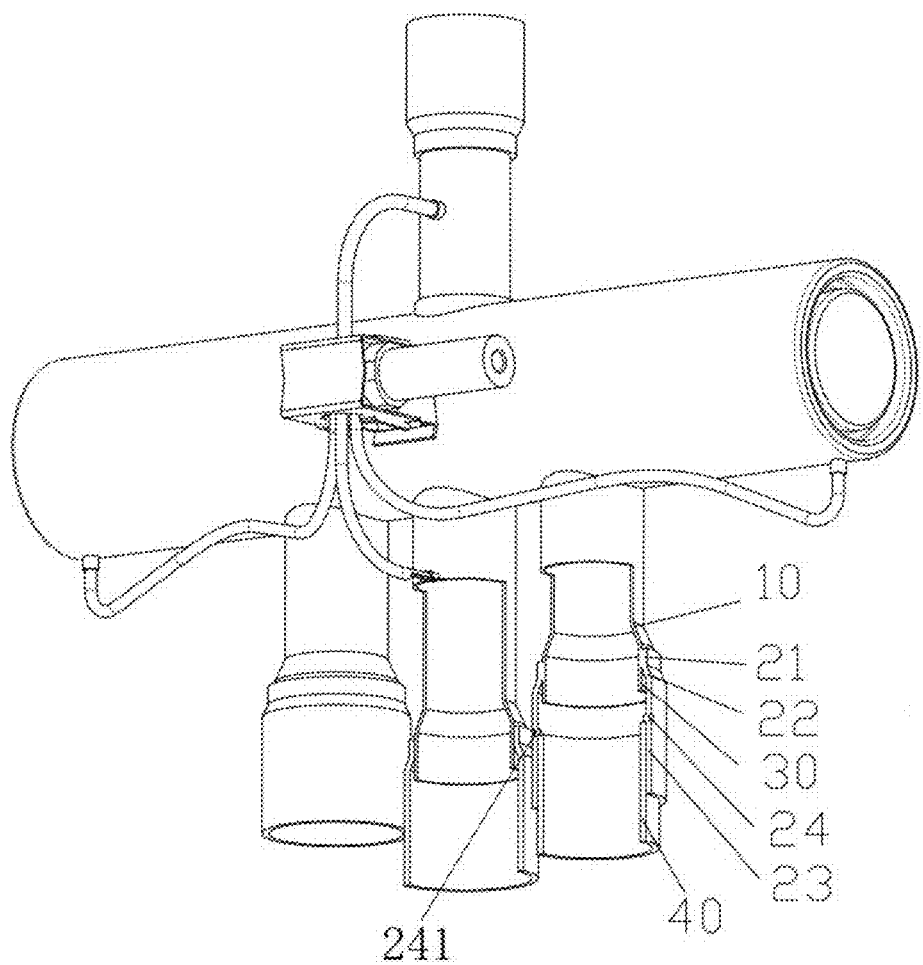
FIG. 5 illustrates a structural schematic diagram of the second embodiment of the control valve assembly provided by the present disclosure.

As shown in FIG. 4 and FIG. 5, Embodiment 2 of the present disclosure provides a connecting pipe assembly, which differs from Embodiment 1 in that: a limiting structure 24 is disposed on the inner wall of the connecting sleeve 20, the limiting structure 24 is axially spaced apart from the first end of the first connecting pipe 10, and the limiting structure 24 is used for limiting an axial position of the second connecting pipe 40 in the connecting sleeve 20. By the limiting structure 24, the end face of the second connecting pipe 40 and the end face of the first connecting pipe 10 have a certain distance in between, so that the accommodating area of the accommodating cavity 30 is further increased and the accommodating cavity can accommodate more weld beading, welding slag or excess solder, further improving the welding effect.

In some embodiments, a plurality of limiting structures 24 are disposed on the inner wall of the connecting sleeve 20, and the plurality of limiting structures 24 are disposed in circles on the inner wall of the connecting sleeve 20. By the above arrangement, the axial position of the second connecting pipe 40 in the connecting sleeve 20 can be further limited, thereby ensuring the connection stability between the second connecting pipe 40 and the connecting sleeve 20.

In some embodiments, a plurality of protrusions 241 are disposed on an inner wall of the connecting sleeve 20, the plurality of protrusions 241 form the limiting structure 24, and the plurality of protrusions 241 are spaced in circles on the inner wall of the connecting sleeve 20.

In some embodiments, the limiting structure 24 includes a protrusion, and the protrusion is disposed in circles on the inner wall of the connecting sleeve 20. By such arrangement, the contact area between the protrusion and the second connecting pipe 40 can be increased, and the axial position of the second connecting pipe 40 in the connecting sleeve 20 can be limited, thereby facilitating welding of the second connecting pipe 40 with the connecting sleeve 20, and further ensuring the connection stability between the second connecting pipe 40 and the connecting sleeve 20.

Another embodiment of the present disclosure provides a control valve assembly, and the control valve assembly includes the connecting pipe assembly provided in the aforementioned embodiment.

According to the technical solution provided by the present disclosure, the first end of the first connecting pipe 10 is disposed in the connecting sleeve 20, the inner wall of the middle part of the connecting sleeve 20 and the outer wall of the first end of the first connecting pipe 10 have a gap in between, and the gap forms an accommodating cavity 30. The accommodating cavity 30 can accommodate the resulting weld beading, welding slag or excess solder when the connecting sleeve 20 is welded with the second connecting pipe 40, thereby preventing the weld beading, welding slag or excess solder from flowing out of the weld joint, improving the welding effect, and ensuring normal use of the control valve. Moreover, the limiting structure 24 is disposed on the inner wall of the connecting sleeve 20, so that the connection stability between the second connecting pipe 40 and the connecting sleeve 20 is ensured.

It should be noted that the terms used herein are only for describing specific implementations, but are not intended to limit exemplary implementations according to the present disclosure. As used herein, unless otherwise explicitly stated in the context, the singular form is also intended to include the plural form. Moreover, it should be understood that when the terms "comprise" and/or "include" are used in the description, they indicate the presence of features, steps, operations, devices, components, and/or combinations thereof.

Unless otherwise specified, the relative arrangement, numerical expressions and numerical values of the components and steps described in the embodiments do not limit the scope of the present disclosure. Also, it should be understood that for ease of description, the dimensions of respective parts shown in the accompanying drawings are not drawn according to the actual proportional relationship. The technology, method and equipment known to those of ordinary skill in related art may not be discussed in detail, but in appropriate cases, such technology, method and equipment should be considered as part of the authorized description. In all examples shown and discussed herein, any specific value should be explained as merely illustrative but not limitative. Therefore, other examples of exemplary embodiments may include different values. It should be noted that similar labels and letters represent similar terms in the following accompanying drawings, so once an item is defined in an accompanying drawing, the item is not further discussed in the following accompanying drawings.

In the description of the present disclosure, it should be understood that the orientational or positional relationships indicated by directional terms such as "front, back, up, down, left, right", "horizontal, longitudinal, vertical, horizontal", and "top, bottom" are usually based on the orientational or positional relationships shown in the drawings, and are only for ease of describing the present disclosure and simplifying the description. Without contrary explanation, these directional terms do not indicate or imply that the device or component referred to must have a specific orientation or be structured and operated in a specific orientation, and therefore cannot be understood as a limitation on the protection scope of the present disclosure. The directional terms of "inside and outside" refer to inside and outside relative to the contour of a component.

For ease of description, spatial relative terms such as "on top of . . . ", "above . . . ", "on the upper surface of . . . ", and "on", can be used herein to describe the spatial positional relationship between a device or feature as shown and other devices or features in the drawings. It should be understood that the spatial relative terms are intended to include different orientations in use or operation other than those described in the drawing of devices. For example, if a device in the drawings is inverted, the device described as "above other devices or structures" or "on top of other devices or structures" will be positioned as "below other devices or structures" or "under other devices or structures". Therefore, the exemplary term "above . . . " may include two orientations "above . . . " and "below . . . ". The device may also be positioned in different orientations (rotated 90 degrees or in other orientations), and the spatial relative description used herein is explained accordingly.

Furthermore, it should be noted that the use of terms such as "first" and "second" for defining components is only for the purpose of distinguishing the corresponding components. Unless otherwise stated, such terms do not have any special meanings and therefore cannot be understood as limiting the protection scope of the present disclosure.

The above are only exemplary embodiments of the present disclosure and are not intended to limit the present disclosure. For those skilled in the art, the present disclosure may have various modifications and variations. Any modifications, equivalent replacements and improvements made within the spirit and principle of the present disclosure shall be included in the protection scope of the present disclosure.

What is claimed is:

1. A connecting pipe assembly, wherein the connecting pipe assembly comprises:
    a first connecting pipe, wherein the first connecting pipe comprises a first end and a second end opposite to each other;
    a connecting sleeve, wherein the first end of the first connecting pipe is disposed in the connecting sleeve, the connecting sleeve comprises a first end and a second end opposite to each other, the first end of the connecting sleeve is connected with an outer side wall of the first connecting pipe, there is a gap between an inner wall of a middle part of the connecting sleeve and the outer side wall of the first end of the first connecting pipe, and the gap forms an accommodating cavity; and
    a second connecting pipe, wherein one end of the second connecting pipe is connected with the second end of the connecting sleeve, and the one end of the second connecting pipe is disposed in the connecting sleeve;
    a wall thickness of the second connecting pipe is T, and a maximum dimension of the gap in radial direction of the first connecting pipe is t, $0<t<T$; the one end of the second connecting pipe disposed in the connecting sleeve is abutted against the first end of the first connecting pipe, and the one end of the second connecting pipe disposed in the connecting sleeve, the outer wall of the first end of the first connecting pipe and the inner wall of the middle part of the connecting sleeve work together to seal the accommodating cavity; or
    a limiting structure is disposed on an inner wall of the connecting sleeve, the limiting structure is axially spaced apart from the first end of the first connecting pipe, and the limiting structure is used for limiting an axial position of the second connecting pipe in the connecting sleeve.

2. The connecting pipe assembly as claimed in claim 1, wherein the connecting sleeve comprises a first section, a second section and a third section which are connected with each other; the first section of the connecting sleeve is connected with the first connecting pipe; the third section of the connecting sleeve is connected with the second connecting pipe; the accommodating cavity is formed between an inner wall of the second section and the outer wall of the first end of the first connecting pipe; and an inner diameter of the second section gradually increases along a direction from the first section to the third section.

3. The connecting pipe assembly as claimed in claim 2, wherein an inner diameter of the third section is D, and a diameter of the outer wall of the first end of the first connecting pipe is d, $t=(D-d)*0.5$.

4. The connecting pipe assembly as claimed in claim 2, wherein a length of the first section is L1, a distance between an end face of the first end of the connecting sleeve and an end face of the first end of the first connecting pipe is L2, and the maximum axial length of the accommodating cavity is L, $L=L2-L1$, and $L>0$.

5. The connecting pipe assembly as claimed in claim 1, wherein the limiting structure comprises a protrusion, and the protrusion is annularly disposed on the inner wall of the connecting sleeve.

6. A control valve assembly, wherein the control valve assembly comprises the connecting pipe assembly as claimed in claim 1.

7. The control valve assembly as claimed in claim 6, wherein the connecting sleeve comprises a first section, a second section and a third section which are connected with each other; the first section of the connecting sleeve is connected with the first connecting pipe; the third section of the connecting sleeve is connected with the second connecting pipe; the accommodating cavity is formed between an inner wall of the second section and the outer wall of the first end of the first connecting pipe; and an inner diameter of the second section gradually increases along a direction from the first section to the third section.

8. The control valve assembly as claimed in claim 7, wherein an inner diameter of the third section is D, and a diameter of the outer wall of the first end of the first connecting pipe is d, $t=(D-d)*0.5$.

9. The control valve assembly as claimed in claim 7, wherein a length of the first section is L1, a distance between an end face of the first end of the connecting sleeve and an end face of the first end of the first connecting pipe is L2, and the maximum axial length of the accommodating cavity is L, $L=L2-L1$, and $L>0$.

10. The control valve assembly as claimed in claim 6, wherein the limiting structure comprises a protrusion, and the protrusion is annularly disposed on the inner wall of the connecting sleeve.

\* \* \* \* \*